(12) United States Patent
Hyoung et al.

(10) Patent No.: US 8,165,236 B2
(45) Date of Patent: Apr. 24, 2012

(54) HUMAN BODY COMMUNICATION METHOD USING MULTI-CARRIER MODULATION METHOD

(75) Inventors: Chang-Hee Hyoung, Daejeon (KR);
Sung-Weon Kang, Daejeon (KR);
Jung-Hwan Hwang, Daejeon (KR);
Duck-Gun Park, Daejeon (KR);
Jin-Kyung Kim, Daejeon (KR);
Jin-Bong Sung, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 749 days.

(21) Appl. No.: 12/297,930

(22) PCT Filed: Apr. 20, 2007

(86) PCT No.: PCT/KR2007/001945
§ 371 (c)(1),
(2), (4) Date: Oct. 21, 2008

(87) PCT Pub. No.: WO2007/123343
PCT Pub. Date: Nov. 1, 2007

(65) Prior Publication Data
US 2009/0103643 A1    Apr. 23, 2009

(30) Foreign Application Priority Data

Apr. 21, 2006   (KR) .................. 10-2006-0036357
Nov. 3, 2006    (KR) .................. 10-2006-0108364

(51) Int. Cl.
*H04K 1/10*    (2006.01)
(52) U.S. Cl. ........ 375/260; 375/261; 375/269; 370/225; 370/208; 370/342
(58) Field of Classification Search .................. 375/260, 375/269, 261; 370/338, 208, 342, 225
See application file for complete search history.

(56) References Cited

U.S. PATENT DOCUMENTS
6,223,018 B1   4/2001   Fukumoto et al.
(Continued)

FOREIGN PATENT DOCUMENTS
CN          1639996 A      7/2005
(Continued)

OTHER PUBLICATIONS

Toshiaki Yamamoto et al., "A Study on Optimal Transmit Power Control Algorithm for Subcarrier Adaptive Modulation", Technical Report of IEICE, Oct. 12, 2010, pp. 85-90, The Institute of Electronics, Information and Communication Engineers.

(Continued)

*Primary Examiner* — Eva Puente (57) ABSTRACT

Provided is a human body communication method using a multi-carrier modulation method, in which users do not interfere with each other in an environment with several users, and stable communication is possible when users are exposed to strong interference generated at other electronic devices. Also, provided are a multi-carrier modulation method, in which data between communication devices connected to a human body used as a channel is divided into a plurality of sub-channels and the data is transmitted by loading it on each of a plurality of sub-carrier signals, and a multi-connection method using the multi-carrier modulation method. The plurality of sub-channels having a predetermined bandwidth include several sub-carriers, and by changing a modulation method applied to the sub-carriers, stable communication can be realized.

6 Claims, 8 Drawing Sheets

U.S. PATENT DOCUMENTS

| | | |
|---|---|---|
| 6,754,472 B1 | 6/2004 | Williams et al. |
| 2003/0043928 A1* | 3/2003 | Ling et al. ............... 375/267 |
| 2005/0117661 A1* | 6/2005 | Kim ............... 375/302 |
| 2006/0034382 A1* | 2/2006 | Ozluturk et al. ............... 375/267 |
| 2006/0045118 A1 | 3/2006 | Hyoung et al. |
| 2006/0092908 A1* | 5/2006 | Sung et al. ............... 370/347 |
| 2006/0227753 A1* | 10/2006 | Vleugels et al. ............... 370/338 |
| 2008/0171925 A1* | 7/2008 | Xu et al. ............... 600/316 |

FOREIGN PATENT DOCUMENTS

| | | |
|---|---|---|
| EP | 1 102 215 A2 | 5/2001 |
| EP | 1 255 369 A1 | 11/2002 |
| JP | 11-225119 | 8/1999 |
| JP | 2001-077735 | 3/2001 |
| JP | 2001-298425 | 10/2001 |
| JP | 2003-218831 | 7/2003 |
| JP | 2004-364009 A | 12/2004 |
| KR | 1020020057593 A | 7/2002 |
| KR | 1020060030926 A | 4/2006 |
| WO | WO 03/075479 A1 | 9/2003 |

OTHER PUBLICATIONS

International Search Report, PCT/KR2007/001945, filed on Apr. 20, 2007.

Seong-Jun Song et al., "A 2Mb/s Wide Band Pulse Transceiver With Direct-Coupled Interface for Human Body Communications," 2006, pp. 558-559, 672, SSCC 2006/Session 30/Silicon for Biology/30.4, IEEE International Solid-State Circuits Conference.

Mitsuru Shinagawa et al., "A Near-Field-Sensing Transceiver for Intrabody Communication Based on the Electrooptic Effect," Dec. 2004, pp. 1533-1538, IEEE Transactions on Instrumentation and Measurement, vol. 53, No. 6, IEEE.

* cited by examiner

HUMAN BODY COMMUNICATION METHOD USING MULTI-CARRIER MODULATION METHOD

TECHNICAL FIELD

The present invention relates to human body communication using a multi-carrier modulation method, and more particularly, to a method to accomplish stable communication state in case human body is used as a transmission channel.

BACKGROUND ART

Human body communication is a technology for transmitting signals between devices connected to a human body, using the conductive human body as a communication channel. A communication network between various portable devices, such as personal digital assistants (PDAs), portable personal computers, digital cameras, MP3 players, mobile phones, etc. and stationary devices, such as printers, televisions, entrance systems, etc. can be formed by a user simply contacting each of the devices.

A conventional human body communication technology realizes low speed data communication at a maximum speed of several tens of Kbps using a specific frequency, such as frequency shift keying (FSK) or amplitude shift keying (ASK). An application field of the conventional human body communication technology is limited to a field that requires simple data transmission.

A technology for directly applying a digital signal, i.e., a non return to zero (NRZ) signal, to a human body and restoring a received signal using a photoelectric effect realizes 10 Mbps communication by remarkably improving transmission speed.

Figure 1:
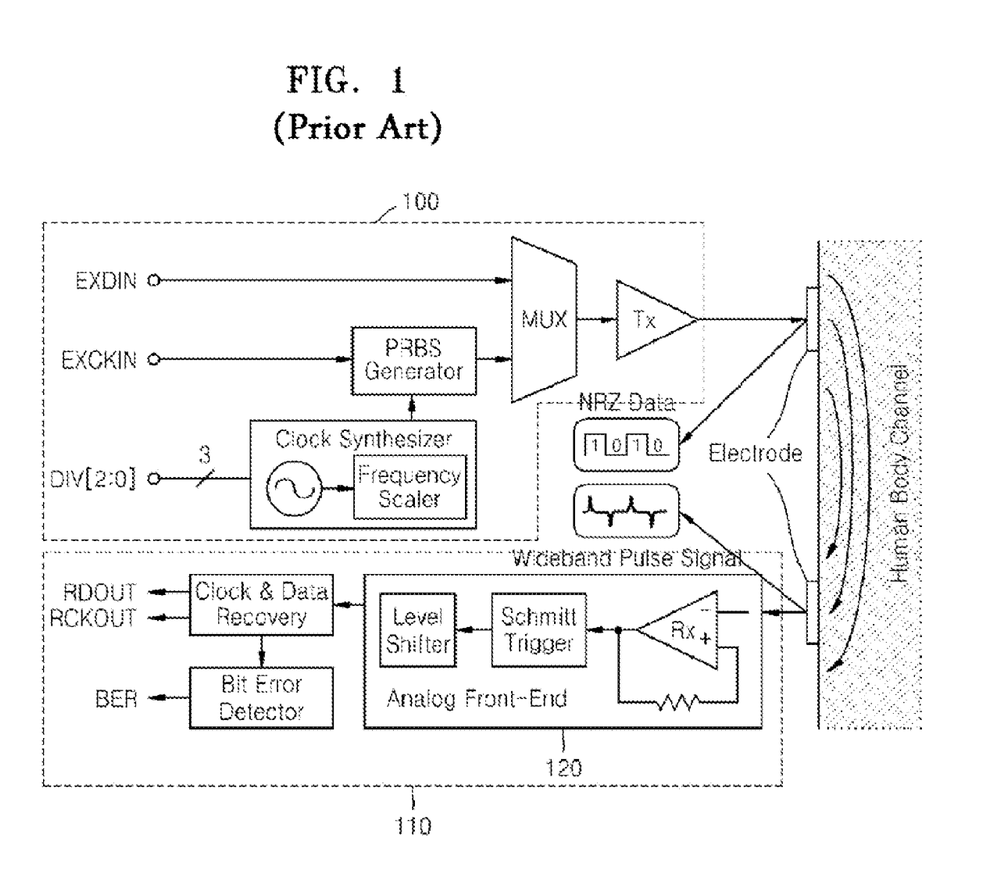
FIG. 1 is a diagram illustrating a conventional communication apparatus which directly applies an NRZ signal to a human body and electrically restores an NRZ signal.

FIG. 1 is a diagram illustrating a conventional communication apparatus which directly applies an NRZ signal to a human body and electrically restores an NRZ signal.

The conventional communication apparatus includes an NRZ data transmitter 100 and a clock and data recovery (CDR) based receiver 110.

A wideband pulse signal received through a human body channel is amplified by a preamplifier and 0 and 1 states are restored by a trigger.

An amplitude value of the restored signal is down to a ground level by a level shifter and then the restored signal is inputted into the CDR.

Figure 2A:
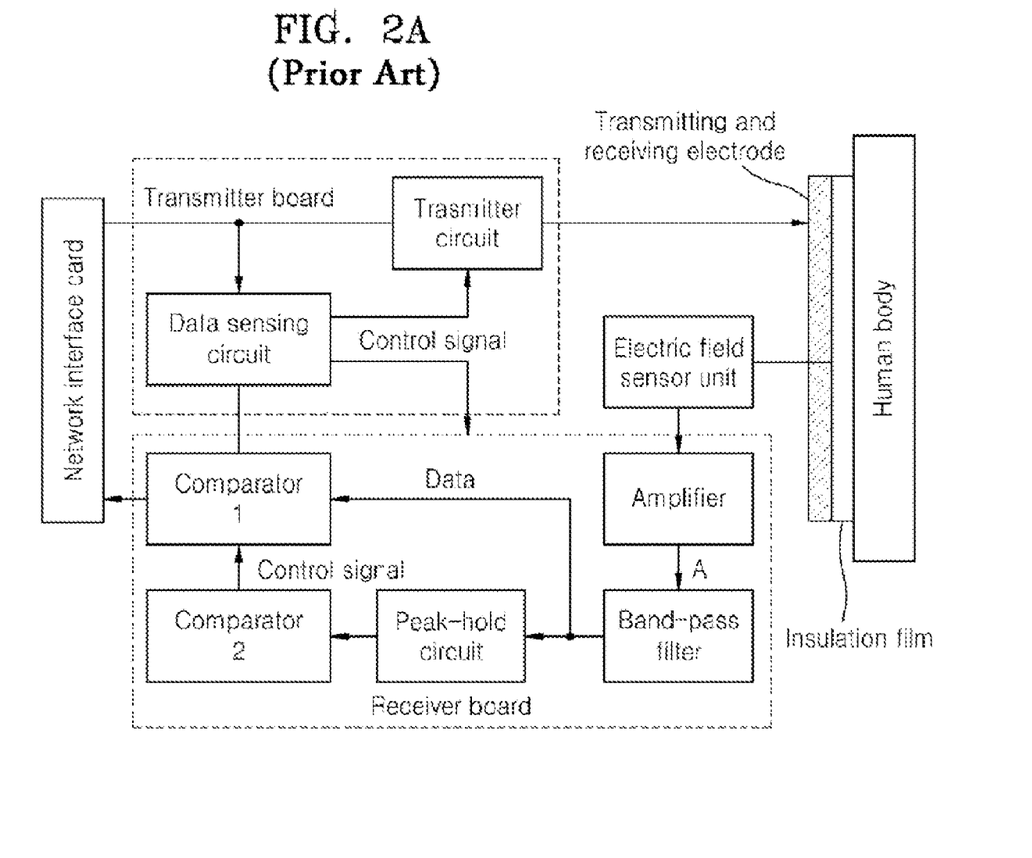
FIGS. 2A and 2B are diagrams illustrating another conventional communication apparatus which directly applies an NRZ signal to a human body and restores an NRZ signal using an electro-optic (EO) effect.
Figure 2B:
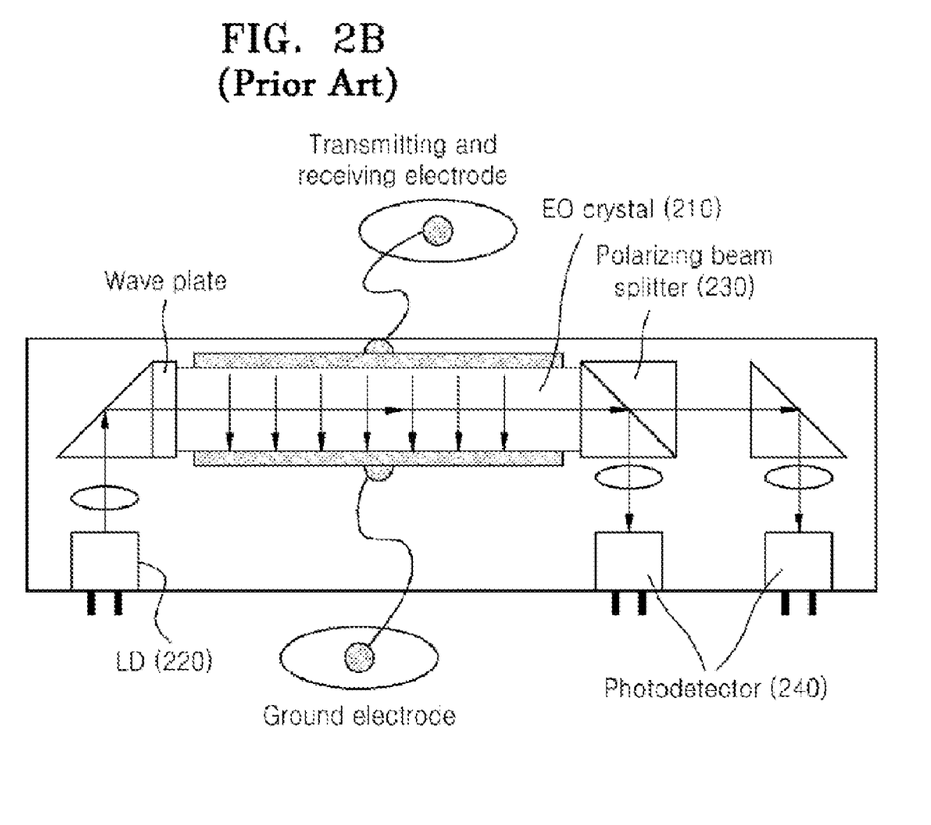

FIGS. 2A and 2B are diagrams illustrating another conventional communication apparatus which directly applies an NRZ signal to a human body and restores an NRZ signal using an electro-optic (EO) effect.

An electric field generated by a human body changes a refractive index of an EO crystal 210 illustrated in FIG. 2B.

The polarization of the light emitted from a laser diode 220 is varied with the change of the refractive index of the EO crystal.

The variation of the polarization of the light results in the electric power change which is measured by a polarizing beam splitter 230 and two photo detectors (PDs) 240.

Such high speed data transmission widens the application fields of conventional communication apparatuses, which has been limited to a simple data transmission, to surroundings of life.

Despite such improvement in the communication speed, the technology of using the photoelectric effect is unable to be applied in small devices due to technical problems, such as the size of a module, power consumption, etc.

In order to solve the above problems, technologies of using an electrical restoration have been introduced. These technologies not only realize 2 Mbps communication but can also be realized in a single chip that can be applied in various electronic devices.

Such technologies can be used in realizing a network between various sensors that can be applied to a human body, such as electrocardiographs (ECGs), non-invasive blood pressures (NIBPs), heart monitors, etc, and also a human body based network, such as a wearable computer, which was difficult to be realized.

A human body is formed of various materials in various forms, and can function as an antenna in a wide frequency domain due to its conductivity and high dielectric constant.

Based on the above properties, the human body can be used as an antenna for communication, but the human body may be exposed to a signal that is not desired from an external electronic device.

Frequency modulation, such as FSK, ASK, or phase shift keying (PSK) can select and use a domain having low exterior interference.

In realizing communication, low signal-to-noise ratio may be requested or interference may be difficult to be resolved.

A method of directly transmitting a digital signal requires a very wide bandwidth, and the digital signal may be received from a transmitter after having been exposed to strong interference from peripheral devices.

When interference is generated in a signal bandwidth, a desired signal is unable to be properly separated even if the reception of a receiver is good.

Also, in order to directly transmit a digital signal at a rate of several Mbps, a bandwidth of over several tens of MHz is required. When this digital signal is applied to a human body, a frequency of a signal greater than a certain frequency is emitted. Accordingly when there are several users, interference between users occurs even though they are not in contact. Thus, a stable network cannot be realized.

DISCLOSURE OF INVENTION

Technical Problem

The present invention provides a human body communication method through which users do not interfere with each other in an environment with several users and stable communication is irrelevant to the strong interference generated at other electronic devices.

Technical Solution

According to an aspect of the present invention, there is provided a human body communication method, communicating with a plurality of peripheral devices using a human body as a channel, the human body communication method including: determining whether to use a channel; forming a plurality of sub-channels having a predetermined bandwidth; determining whether an interference signal from the peripheral devices exists in the bandwidth of the sub-channels; determining a modulation method for modulating the sub-channels based on the determination of whether the interference signal exists; mapping data to symbol data based on the determined modulation method; and loading the mapped symbol data on a sub-carrier.

Advantageous Effects

As described above, according to a human body communication using the multi-carrier modulation method, the human body communication is limited to certain frequency in order to reduce interference between users that is caused by using a conventional high speed communication method using a human body. Also, instead of directly transmitting a digital signal, a modulation method, such as a QPSK or a QAM, is used in the limited frequency in order to increase efficiency of frequency.

Also, using the multi-carrier modulation method, stable communication is possible in an environment where channel characteristics for each frequency are different, and a network can be formed in an environment where strong RF interference exists in a signal band.

In addition, effective communication can be realized since multiple connections between various devices connected to a user are possible.

BEST MODE

According to an aspect of the present invention, there is provided a human body communication method, communicating with a plurality of peripheral devices using a human body as a channel, the human body communication method including: determining whether to use a channel; forming a plurality of sub-channels having a predetermined bandwidth; determining whether an interference signal from the peripheral devices exists in the bandwidth of the sub-channels; determining a modulation method for modulating the sub-channels based on the determination of whether the interference signal exists; mapping data to symbol data based on the determined modulation method; and loading the mapped symbol data on a sub-carrier.

Mode for Invention

Hereinafter, the present invention will be described more fully with reference to the accompanying drawings, in which exemplary embodiments of the invention are shown.

Figure 3:
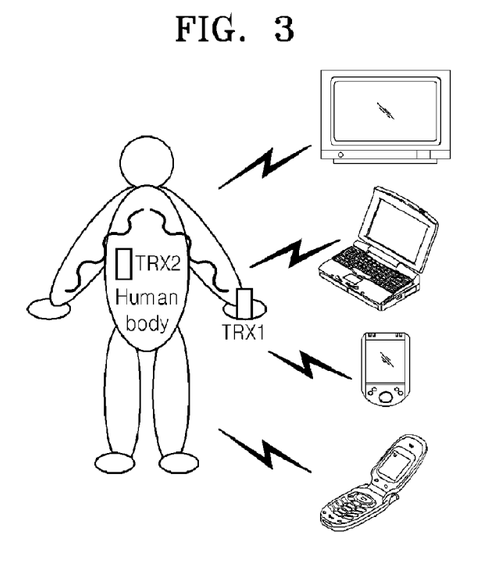
FIG. 3 is a diagram illustrating communication when a user is strongly interfered with by other electronic devices.

FIG. 3 is a diagram illustrating communication when a user is strongly interfered with by other electronic devices.

Figure 4:
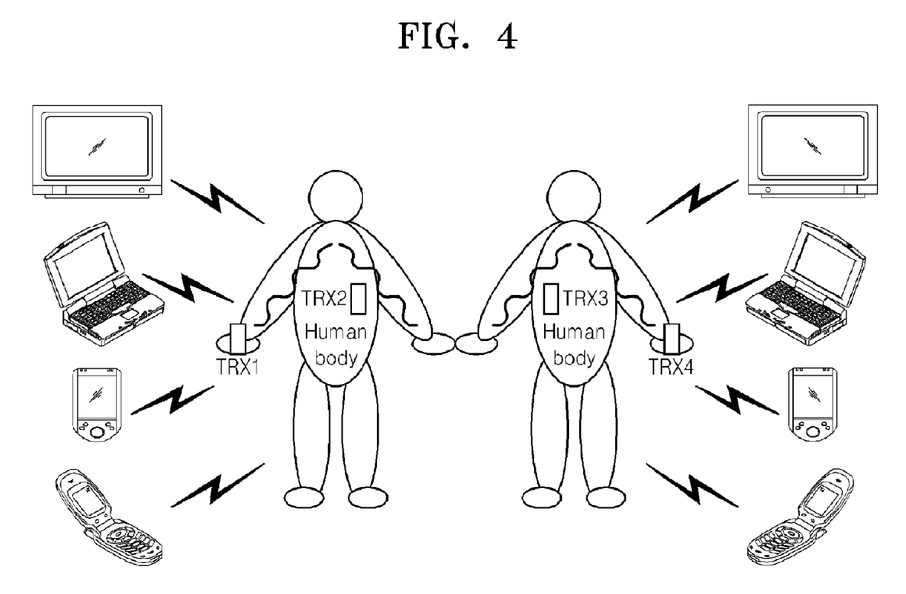
FIG. 4 is a diagram illustrating communication in an environment with various users, when there is interference between users and when users are exposed to strong interference from other electronic devices.

FIG. 4 is a diagram illustrating communication in an environment with a couple of users, when there is interference between users and when users are exposed to strong interference generated at other electronic devices.

When peripheral devices such as communication devices, sounders, image display devices, operation processors, and medical sensors are to be simultaneously used in an environment with a single user or a number of users, a signal passing through a human body is distorted by strong radio frequency (RF) interference signals generated in the peripheral devices.

Accordingly in the present invention, the frequency band of a signal that can be applied to each human body is limited in order to prevent interference between adjacent users.

A communication method for increasing a data transmission speed in a limited frequency bandwidth and a multi-connection method using the communication method are provided.

In order for various adjacent users to realize stable communication without interfering with each other, a frequency occupied by a signal transmitted through a human body is kept below a frequency that does not affect an adjacent person.

When a human body is used as a channel, available frequency is limited. Accordingly, the communication speed of directly transmitted digital signals is limited.

The fastest communication speed is 10 Mbps. The signal occupied high frequency domain of at least several tens of MHz is applied to a human body. The signal is not limited to the human body, but interferes with adjacent users through radiation.

In other words, using a conventional technology, stable communication is difficult to be realized when several users are present in a limited space, since the users interfere with each other.

Accordingly in order to solve the above problem, a communication method for increasing the efficiency of an allocated frequency in limited frequency bandwidth and realizing stable communication in an environment in which a human body is exposed to electro-magnetic interference from various electronic devices is provided.

First, in order to increase the efficiency of the allocated frequency bandwidth, a modulation method that increases the number of bits per symbol that can be expressed is used.

An example of the modulation method is quadrature phase shift keying (QPSK), which is a variation of conventional phase shift keying (PSK).

In the case of the PSK used in conventional human body communication, two information streams can be expressed using one carrier. However, in the case of QPSK, the phase of a carrier is divided into 4 states, each state expressing designated information. Accordingly, the number of bits per symbol is doubled.

Also, a quadrature amplitude modulation (QAM) method which expresses information with the amplitude of a carrier can be simultaneously applied in order to even further increase the number of bits per symbol that can be expressed based on a level given to a phase and amplitude of the carrier.

When the QAM method is applied, a communication method which can transmit data at high speed in a band limited by radiation of a human body can be realized.

In such a communication method, interference does not occur when several users are adjacent to each other. However, strong signal interference from external devices to a human body in a frequency band of a signal used in the communication cannot be prevented.

Since a human body has different transmission characteristics at each frequency, an equalizer which gets to the fine characteristics of each channel at a receiver is required in order to apply the QAM method. Also, the human body is susceptible to impulse noise and interference in an occupied frequency.

A multi-carrier modulation method is a communication method used to maintain efficiency of using frequency in a channel environment having a different signal to noise ratio for each frequency.

Figure 5:
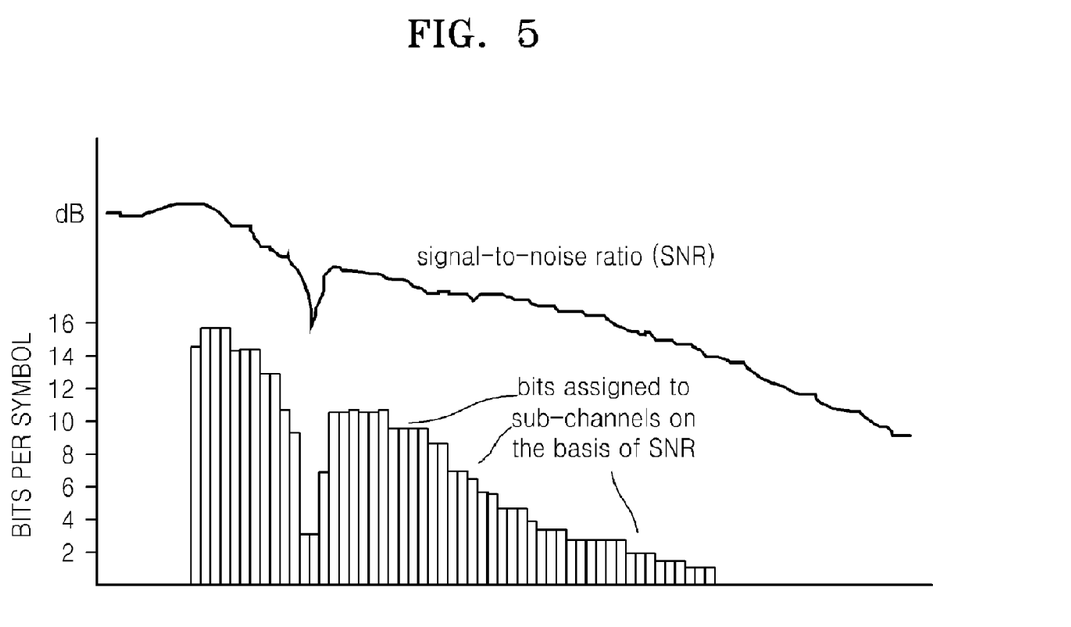
FIG. 5 is a graph illustrating the characteristics of a multi-carrier modulation method in a channel having different properties for each frequency according to an embodiment of the present invention, in an environment illustrated in FIG. 3 or FIG. 4.

FIG. 5 is a graph illustrating the characteristics of a multi-carrier modulation method in a channel having different properties for each frequency according to an embodiment of the present invention, in an environment illustrated in FIG. 3 or FIG. 4. As illustrated in FIG. 5, the multi-carrier modulation method is made to be suitable in a channel having a different signal to noise ratio for each frequency. The channel is composed of several sub-carriers.

Figure 6:
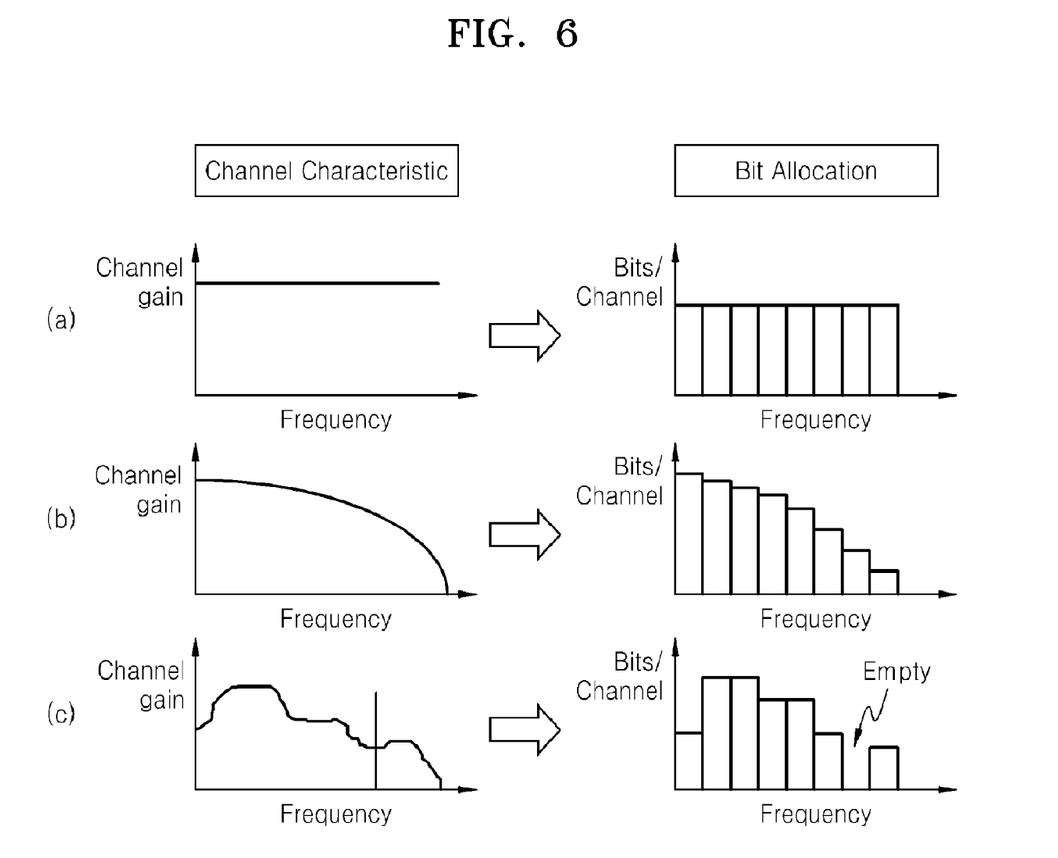
FIG. 6 illustrates embodiments realizing stable communication of an actual communication environment according to the present invention, in an environment illustrated in FIG. 3 or FIG. 4.

FIG. 6 illustrates embodiments of the present invention in which stable communication of an actual communication environment is realized, in an environment illustrated in FIG. 3 or FIG. 4.

When sub-channel gain characteristics do not change according to the frequency domain as illustrated in (a) of FIG. 6, a modulation method wherein each sub-carrier has the same bit per symbol is used.

However in an actual communication environment, most of the channels have gain characteristics shown in FIG. 5 or (b) of FIG. 6. Accordingly, various modulation methods can be used based on characteristics of each sub-channel.

When strong RF interference exists at an available frequency as illustrated in (c) of FIG. 6, the multi-carrier modulation method can selectively and precisely control frequency. That modulation method can be used even in an environment wherein a signal to noise ratio is relatively high by using a certain lower frequency or using a modulation method having a low number of bits per symbol, such as PSK or QPSK.

Also, each sub-carrier in a certain channel can be changed every moment, and thus the channel characteristics may change from time to time. However, using a dynamic allocation method, which automatically regulates the number of bits per symbol in a sub-channel, communication can be realized despite strong RF interference existing in a certain frequency domain that changes from time to time.

In the multi-carrier modulation method, the sub-carriers are orthogonal to each other, and thus do not affect each other.

So far, methods in which a limited frequency bandwidth can be efficiently used without interference between several users have been described, and in order for a user to form a network between various devices, the multi-connection method should be used.

The multi-carrier modulation method has a limited bandwidth, and thus devices exchanging information use the same frequency band. Accordingly, a network in which devices connected through a human body are used in different time can be formed.

Figure 7:
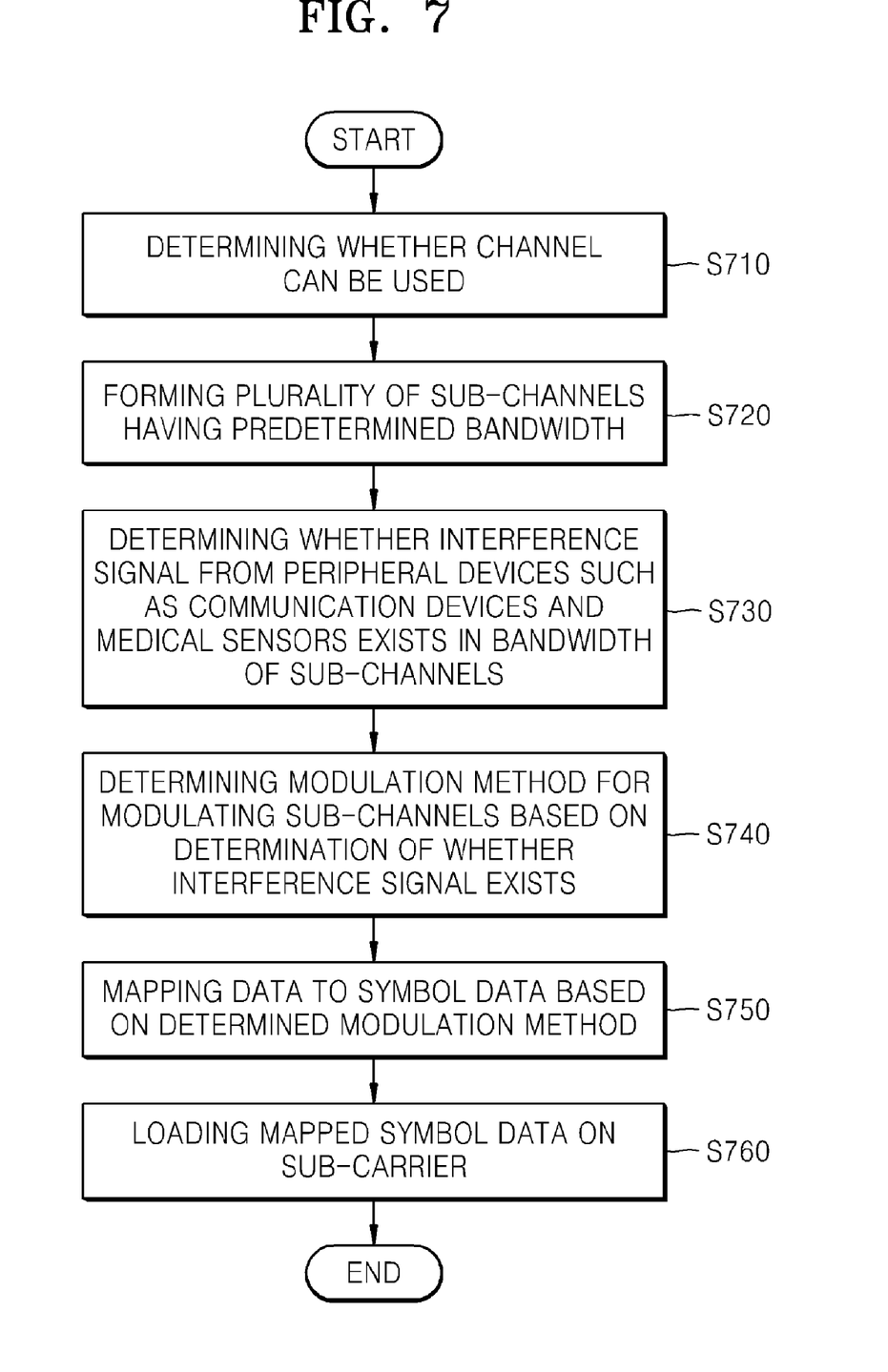
FIG. 7 is a flowchart illustrating a human body communication method using a multi-carrier modulation method according to an embodiment of the present invention.

FIG. 7 is a flowchart illustrating a human body communication method using a multi-carrier modulation method according to an embodiment of the present invention.

In operation S710, it is determined whether a channel can be used.

In operation S720, a plurality of sub-channels having a predetermined bandwidth that sub-channels transmitted through a human body is formed.

In operation S730, it is determined whether an interference signal from peripheral devices, such as communication devices, sounders, image display devices, operation processors, and medical sensors, exists in a bandwidth of the sub-channels. That is, channel states of the sub-channels are determined.

In operation S740, a modulation method for modulating the sub-channels is determined based on the determination of whether the interference signal exists.

In operation S750, data is mapped to symbol data based on the determined modulation method.

In operation S760, the mapped symbol data is loaded on a sub-carrier for communication.

Figure 8:
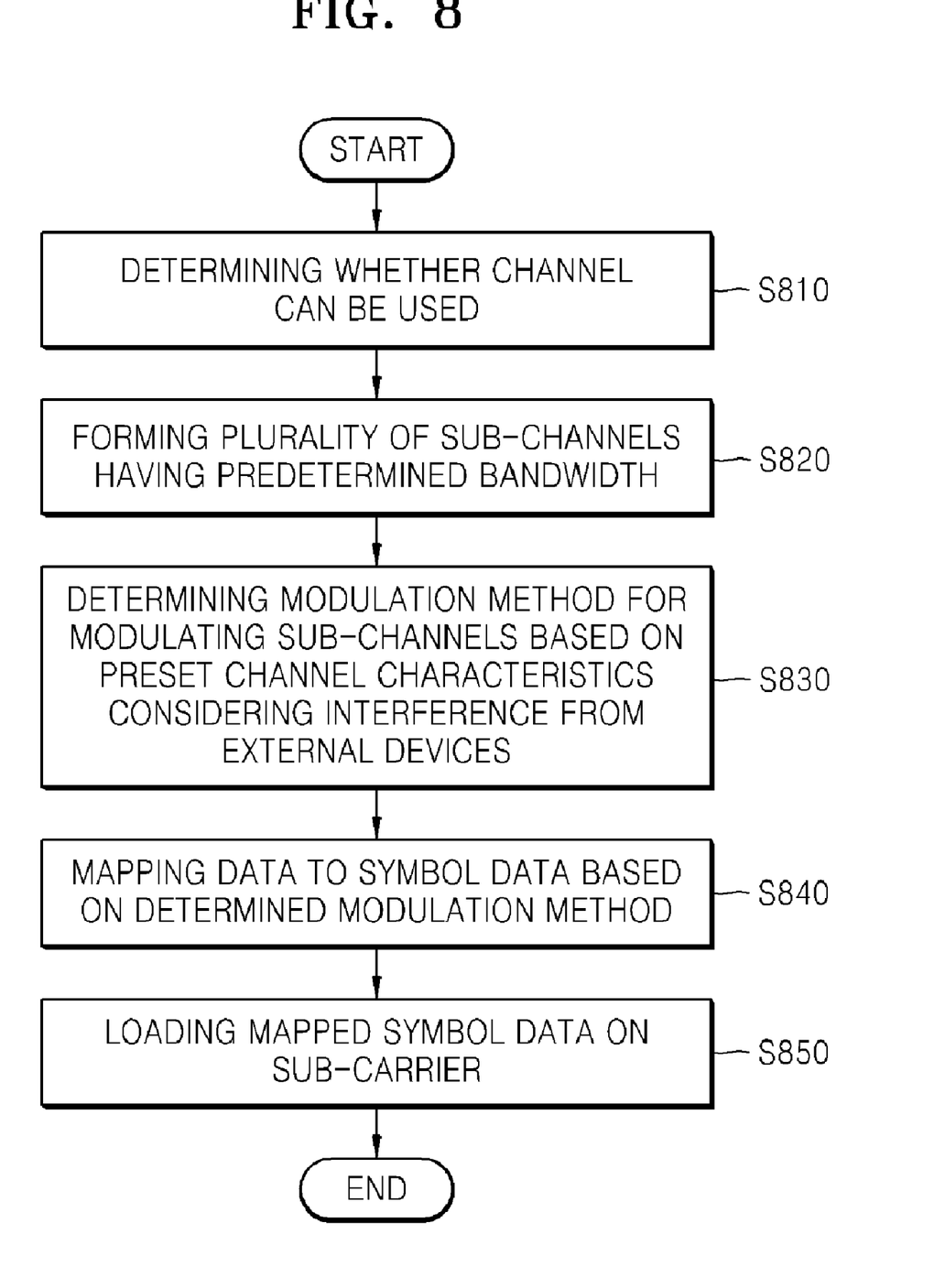
FIG. 8 is a flowchart illustrating a human body communication method using a multi-carrier modulation method, wherein sub-channel modulation is determined based on preset channel characteristics according to an embodiment of the present invention.

FIG. 8 is a flowchart illustrating a human body communication method using a multi-carrier modulation method wherein sub-channel modulation is determined based on preset channel characteristics according to an embodiment of the present invention.

In operation S810, it is determined whether a channel can be used.

In operation S820, a plurality of sub-channels having a predetermined bandwidth that sub-channels transmitted through a human body is formed.

In operation S830, a modulation method for modulating the sub-channels is determined based on preset channel characteristics, considering interference from peripheral devices, such as communication devices, sounders, image display devices, operation processors, and medical sensors.

In operation S840, data is mapped to symbol data based on the determined modulation method.

In operation S850, the mapped symbol data is loaded on a sub-carrier for communication.

The invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, optical data storage devices, and carrier waves (such as data transmission through the Internet). The computer readable recording medium can also be distributed over network coupled computer systems so that the computer readable code is stored and executed in a distributed fashion.

As described above, according to a human body communication using the multi-carrier modulation method, the human body communication is limited to certain frequency in order to reduce interference between users that is caused by using a conventional high speed communication method using a human body. Also, instead of directly transmitting a digital signal, a modulation method, such as a QPSK or a QAM, is used in the limited frequency in order to increase efficiency of frequency.

Also, using the multi-carrier modulation method, stable communication is possible in an environment where channel characteristics for each frequency are different, and a network can be formed in an environment where strong RF interference exists in a signal band.

In addition, effective communication can be realized since multiple connections between various devices connected to a user are possible.

While the present invention has been particularly shown and described with reference to exemplary embodiments thereof, it will be understood by those of ordinary skill in the art that various changes in form and details may be made therein without departing from the spirit and scope of the present invention as defined by the following claims.

INDUSTRIAL APPLICABILITY

The present invention provides a human body communication method through which users do not interfere with each other in an environment with several users and stable communication is irrelevant to the strong interference generated at other electronic devices.

The invention claimed is:

1. A human body communication method using a human body as a transmission medium, the human body communication method comprising:
   determining whether there is a first interference at a given channel due to interference between adjacent users;
   forming a plurality of sub-channels in the given channel;
   determining whether there is a second interference between the sub-channels due to peripheral devices coupled to a given user;
   determining a first modulation method for modulating the sub-channels when it is determined that the first interference exists;
   determining a second modulation method for modulating the sub-channels when it is determined that the second interference exists;
   mapping given data to symbol data based on the first modulation method, the second modulation method or a combination thereof; and
   transmitting the mapped symbol data over the sub-channels through the human body.

2. The human body communication method of claim 1, wherein the peripheral devices include any of a communication device, a sounder, an image display device, an operation processor, and a medical sensor.

3. The human body communication method of claim 1, wherein the second modulation method comprises dividing a transmission time of the sub-channels.

4. The human body communication method of claim 1, wherein the first and the second modulation methods for modulating the sub-channels are pre-set based on characteristics of the sub-channels.

5. The human body communication method of claim 1, wherein the first modulation method is one of a quadrature phase shift keying (QPSK) method and a quadrature amplitude modulation (QAM) method.

6. The human body communication method of claim 5, wherein an amplitude and phase value modulated in the QAM method is any of 4, 16, 32, and 64.

* * * * *